(No Model.)
H. J. TANNER.
TROLLEY GUARD.
No. 526,756. Patented Oct. 2, 1894.
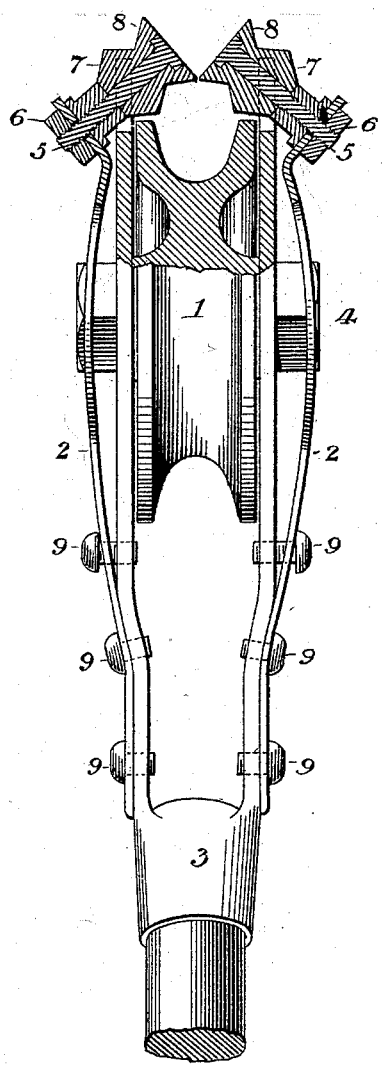
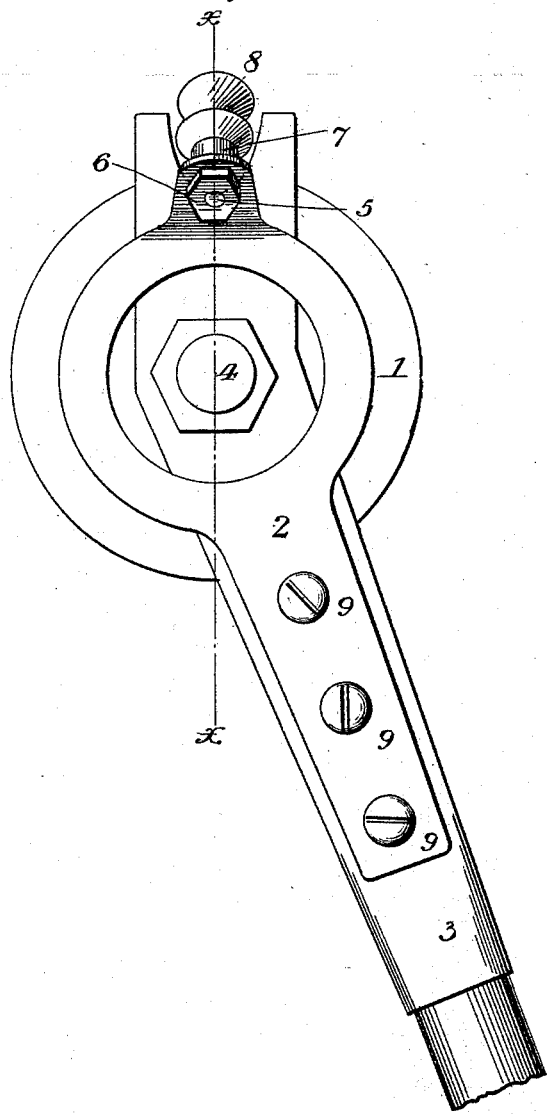
Witnesses:
Annie J. Locke.
Job S. Carpenter.
Inventor:
Henry J. Tanner
by Charles Neave
his atty.

UNITED STATES PATENT OFFICE.

HENRY JOHN TANNER, OF LYNN, ASSIGNOR OF ONE-HALF TO HARRY FAIRFIELD HAMILTON, OF BOSTON, MASSACHUSETTS.

TROLLEY-GUARD.

SPECIFICATION forming part of Letters Patent No. 526,756, dated October 2, 1894.

Application filed April 2, 1894. Serial No. 506,052. (No model.)

*To all whom it may concern:*

Be it known that I, HENRY JOHN TANNER, a citizen of the United States, residing in Lynn, in the county of Essex, State of Massachusetts, have invented a certain new and useful Improvement in Trolley-Guards, of which the following is a full, clear, and exact description.

The object of my invention is to supply a simple and efficient means of preventing the trolley wheel from running off the wire. The wheels now in use are made with a deep groove to receive the trolley wire, but this is not sufficient to prevent the wheel from running off the wire at times. As I employ a device to retain the wheel in its place it is not necessary to make such a deep groove in my wheel and hence I can use a thinner and therefore lighter wheel. Thus I not only make the rotating part of the trolley much lighter than that now in use, and, as a consequence, the trolley head as a whole is lighter.

I will now describe what I consider to be the best form in which I have embodied my improvement, reference being had to the accompanying drawings, forming part of this specification, in which—

Figure 1 is a side view of my improvement and Fig. 2 is a front view partly sectional on the line X X in Fig. 1.

Similar figures refer to similar parts throughout both views.

The yoke 3 is continued beyond the axle 4, and ends above the wheel, 1, having notches formed in it as shown, through which the retaining devices pass. The extensions above the axis are not in a line with the yoke and trolley pole but are bent at an angle of about twenty degrees from that line in a plane parallel to the plane of the trolley wheel, in order that, in the mean position of the trolley pole when on the car, the retaining devices may be vertically above the axis of the wheel. The springs, 2, 2, are fastened upon the yoke by the screws, 9, 9, 9. The two lower screws passing through each spring hold that spring firmly in position and by tightening or loosening the upper screw on each spring the pressure of the springs is regulated. At a point on these springs opposite the above mentioned notches in the upper extremities of the yoke are bolted the arbors, 5, 5, which approach each other at an angle substantially as shown, they being held firmly in place by the nuts 6, 6, and 7, 7. These arbors carry the balls or wheels 8, 8 which are free to rotate upon the arbors.

When my invention is in use the wheel is brought below the trolley wire in the usual way and is then forced against the wire by the ordinary spring at the foot of the trolley pole, the balls or wheels 8, 8 being separated by the wire and brought together again by the springs 2, 2. When it is desired to remove the trolley from the wire it is pulled down in the usual way, the wire forcing the balls or wheels 8, 8, apart and passing between them; but the retaining devices which I use, effectually prevent the wheel from accidentally running off the wire.

I have continued the yoke beyond the axis of the trolley wheel and formed notches in its upper extremities through which the retaining devices pass, in order to afford protection to the retaining devices and their springs. Thus if the balls or wheels of the retaining device meet any obstacles, they are forced against the sides of the above mentioned notches, which prevent the springs being bent and the retaining device being forced permanently out of position; but these extensions of the yoke are employed only as a precaution and my improvement would be equally availed of whether these extensions were used or whether the yoke was made in the usual manner without such extensions.

It is evident that the balls or wheels 8, 8 might be made in a number of shapes and still accomplish substantially the same result. I have used spherical balls, but prefer the form shown in the annexed drawings. When spherical "balls" are used it is not necessary that the arbors carrying them should be fastened to the springs at an angle as in the form which I have described. It is also evident that it is not essential to the operation of my device that the balls or wheels should be capable of rotation on the arbors, but I prefer to so make them in order to eliminate wear on the hangers, and on the wire, when it comes in contact with the balls.

What I claim as my invention, and desire to secure by Letters Patent, is—

1. In a trolley head the combination with a trolley wheel, of a yoke extended beyond the axle of the trolley wheel at an angle of about twenty degrees with the line of the trolley arm and having a notch formed in each of its upper extremities, a spring on each side of and secured to the yoke, an arbor fastened to, each spring and passing through the notches formed in the extremities of the yoke at an angle with the plane of the trolley wheel, and a ball or wheel on each arbor adapted to rotate thereon, the balls or wheels meeting above and in the center plane of the trolley wheel, substantially as described and shown.

2. In a trolley head the combination with a trolley wheel, of a yoke extended beyond the axle of the trolley wheel at an angle of about twenty degrees with the line of the trolley arm and having a notch formed in each of its upper extremities, a spring on each side of and secured to the yoke, an arbor fastened to each spring and passing through the notches formed in the extremities of the yoke, and a ball on each arbor adapted to rotate thereon, the balls meeting above and in the center plane of the trolley wheel, substantially as described.

3. In a trolley head, the combination with a trolley wheel and yoke of balls or wheels which meet above the trolley wire for the purpose of retaining the trolley wheel on the trolley wire, and which are separated by the pressure of the trolley wire upon them when the said wire enters and when it leaves the space inclosed by the retaining devices and the trolley wheel.

HENRY JOHN TANNER.

Witnesses:
G. W. MILES, Jr.,
GERTRUDE L. DAVIS.